United States Patent
Wason et al.

(10) Patent No.: US 10,474,443 B2
(45) Date of Patent: *Nov. 12, 2019

(54) CODE LINEAGE TOOL

(71) Applicant: BANK OF AMERICA CORPORATION, Charlotte, NC (US)

(72) Inventors: Prashant Wason, Charlotte, NC (US); Vijaya Rudraraju, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,612

(22) Filed: Jul. 11, 2017

(65) Prior Publication Data
US 2019/0018663 A1    Jan. 17, 2019

(51) Int. Cl.
*G06F 8/41* (2018.01)
*G06F 16/25* (2019.01)

(52) U.S. Cl.
CPC ............ *G06F 8/427* (2013.01); *G06F 16/254* (2019.01); *G06F 8/43* (2013.01); *G06F 8/433* (2013.01)

(58) Field of Classification Search
CPC . G06F 8/427; G06F 8/43; G06F 8/433; G06F 17/30557
USPC ......................................... 717/141–144, 154
See application file for complete search history.

(56) References Cited

U.S. PATENT DOCUMENTS

| | | | |
|---|---|---|---|
| 5,193,185 A * | 3/1993 | Lanter | G06F 17/30241 |
| 6,434,558 B1 | 8/2002 | MacLeod | |
| 7,493,570 B2 | 2/2009 | Bobbin | |
| 8,819,010 B2 | 8/2014 | Fankhauser | |
| 9,075,860 B2 | 7/2015 | Kozina | |
| 9,348,879 B2 | 5/2016 | Mohammad | |
| 9,384,231 B2 | 7/2016 | Benjamin | |
| 9,514,203 B2 | 12/2016 | Mohammad | |
| 2016/0028580 A1* | 1/2016 | Radivojevic | H04L 41/0213 709/223 |
| 2017/0154087 A1* | 6/2017 | McClure | G06F 17/30572 |
| 2017/0270022 A1* | 9/2017 | Moresmau | G06F 11/3466 |
| 2018/0074819 A1* | 3/2018 | St. John | G06F 8/433 |
| 2018/0089291 A1* | 3/2018 | Vankamamidi | G06F 17/30554 |

* cited by examiner

*Primary Examiner* — Doon Y Chow
*Assistant Examiner* — Timothy P Duncan
(74) *Attorney, Agent, or Firm* — Michael A. Springs (57) ABSTRACT

A code lineage tool includes a scanner, a parser, and an integrator. The scanner identifies elements in ETL code. The parser determines that a first element is affected by a second element and adds the first element to a parse tree and the second element to the parse tree as a sub-node of the first element. The parser determines that the second element is affected by a third element and adds the third element to the parse tree as a sub-node of the second element. The parser determines that a fourth element does not affect the first element and prevents the fourth element from being added to the parse tree or removes the fourth element from the parse tree. The integrator determines that a change to the third element will change the value of the first element and generates a lineage for the first element.

21 Claims, 5 Drawing Sheets

CODE LINEAGE TOOL

TECHNICAL FIELD

This disclosure relates generally to a code lineage tool.

BACKGROUND

An application may be developed and improved upon over time. As more improvements are made to the application, the software code for that application becomes more complex.

SUMMARY OF THE DISCLOSURE

According to an embodiment, a code lineage tool includes a scanner, a parser, and an integrator. The scanner identifies a plurality of elements in extract, transform, load (ETL) software code by scanning the ETL software code. The parser determines, based on a stored grammar file, that a value of a first element of the plurality of elements is affected by a second element of the plurality of elements. The parser also adds the first element to a parse tree and adds the second element to the parse tree as a sub-node of the first element. The parser further determines, based on the stored grammar file, that a value of the second element is affected by a third element of the plurality of elements and adds the third element to the parse tree as a sub-node of the second element. The parser also determines, that a fourth element of the plurality of elements does not affect the value of the first element because the second element affects the value of the first element and in response to the determination that the fourth element does not affect the value of the first element, perform at least one of preventing the fourth element from being added to the parse tree and removing the fourth element from the parse tree. The integrator determines, based on the parse tree, that a change to the third element will change the value of the first element and generates a lineage for the first element, the lineage comprising an identification of the first element and the third element and an indication that the first element is based on the third element.

According to another embodiment, a method includes identifying a plurality of elements in extract, transform, load (ETL) software code by scanning the ETL software code and determining, based on a stored grammar file, that a value of a first element of the plurality of elements is affected by a second element of the plurality of elements. The method also includes adding the first element to a parse tree and adding the second element to the parse tree as a sub-node of the first element. The method further includes determining, based on the stored grammar file, that a value of the second element is affected by a third element of the plurality of elements and adding the third element to the parse tree as a sub-node of the second element. The method also includes determining, that a fourth element of the plurality of elements does not affect the value of the first element because the second element affects the value of the first element and in response to the determination that the fourth element does not affect the value of the first element, performing at least one of preventing the fourth element from being added to the parse tree and removing the fourth element from the parse tree. The method further includes determining, based on the parse tree, that a change to the third element will change the value of the first element and generating a lineage for the first element, the lineage comprising an identification of the first element and the third element and an indication that the first element is based on the third element.

According to yet another embodiment, a system includes a database and a code lineage tool. The database stores extract, transform, load (ETL) software code. The code lineage tool identifies a plurality of elements in the ETL software code by scanning the ETL software code and determines, based on a stored grammar file, that a value of a first element of the plurality of elements is affected by a second element of the plurality of elements. The code lineage tool adds the first element to a parse tree and adds the second element to the parse tree as a sub-node of the first element. The code lineage tool also determines, based on the stored grammar file, that a value of the second element is affected by a third element of the plurality of elements and adds the third element to the parse tree as a sub-node of the second element. The code lineage tool further determines, that a fourth element of the plurality of elements does not affect the value of the first element because the second element affects the value of the first element and in response to the determination that the fourth element does not affect the value of the first element, perform at least one of preventing the fourth element from being added to the parse tree and removing the fourth element from the parse tree. The code lineage tool also determines, based on the parse tree, that a change to the third element will change the value of the first element and generates a lineage for the first element, the lineage comprising an identification of the first element and the third element and an indication that the first element is based on the third element.

Certain embodiments provide one or more technical advantages. For example, an embodiment improves the maintenance and editing of software code by determining the lineage of code elements such that the effect that a change to one code element has on other code elements is determined. As another example, an embodiment improves software code debugging by determining the code elements that are affected by a change to the software code. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

A software application may be developed and improved upon over time. As more improvements are made to the application, the software code for that application becomes more complex. For example, the software code may span multiple files that each include many functions, variables, and other program elements. The program elements may depend upon or rely on other program elements. For example, the value of a variable may depend upon the results of a function call or the value of another variable in another file. As another example, a function may not be called unless the results of another function are available or the value of a certain variable is set. These relationships among the program elements becomes more complex as more files, more functions, and more variables are added to the software code. When bugs or errors occur in the software code, a developer steps through the software code to determine the source of the bug or error. If the software code becomes complex, it may become impossible for the developer to identify the source of the bug or error. For example, the developer may determine that a variable received the wrong value but due to the complexity of the software code, the developer may not be able to identify the cause or reason why the variable received the wrong value. For example, if the software code is too complex, then the developer may not be able to step through the multiple dependencies and nested dependencies that feed the value of the variable. In certain instances, the developer may not even be able to identify the dependencies and nested dependencies due to the complexity of the code. As a result, the developer may not be able to fix the bug or the error and the software application fails.

This disclosure contemplates an unconventional code lineage tool that determines the lineage of program elements using a parse tree. The code lineage tool may determine the dependencies and nested dependencies that feed into certain program elements. In particular embodiments, by using the code lineage tool, a developer may be able to identify and fix bugs and errors in complex source code.

The unconventional code lineage tool determines the lineage of a program element by analyzing and parsing the software code to build a parse tree. The parse tree is then integrated to create a lineage for a particular program element. A software developer may review the lineage to determine the dependencies and nested dependencies that affect the program element.

Figure 1:
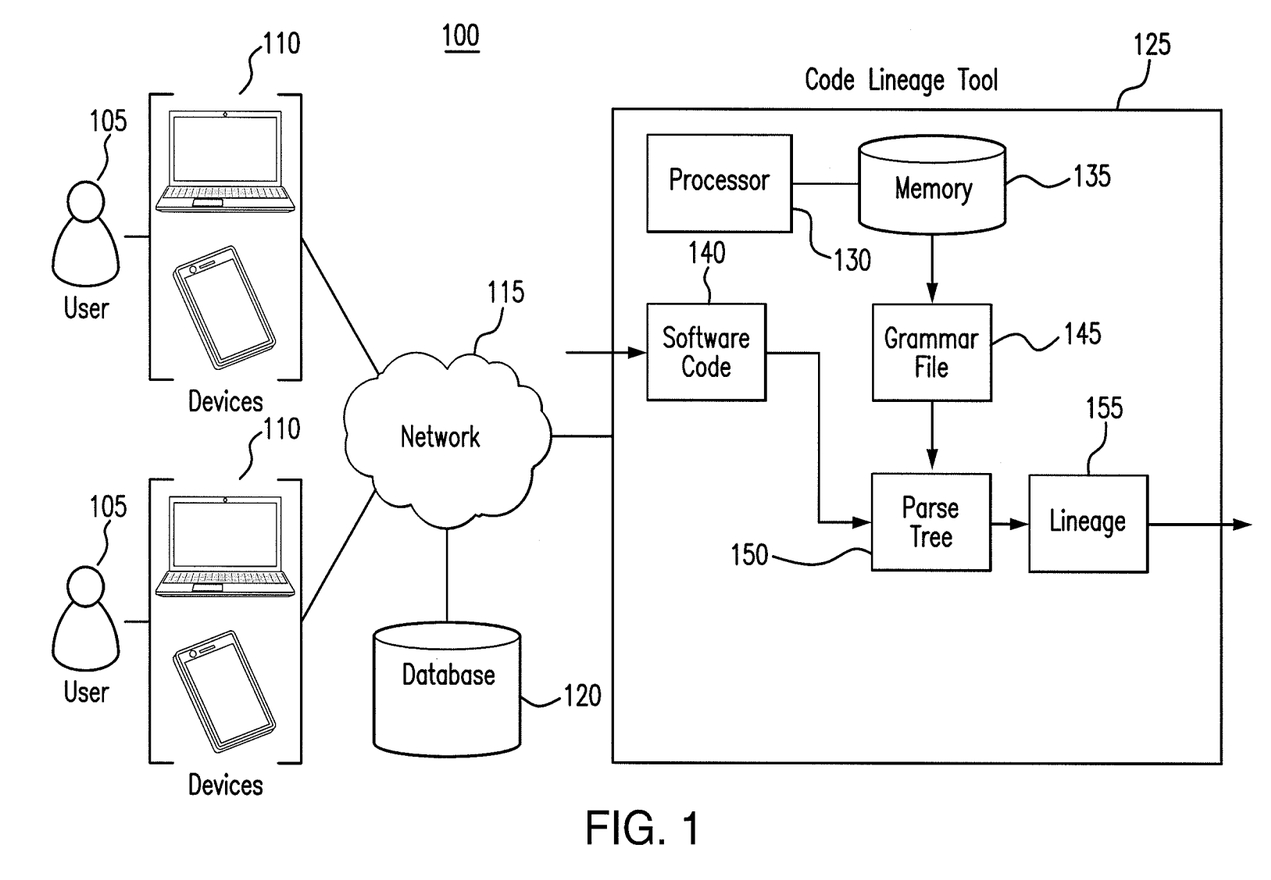
FIG. 1 illustrates a code lineage system.

The code lineage tool will be described using FIGS. 1 through 5. FIG. 1 describes the code lineage tool generally. FIGS. 2 through 5 describe the code lineage tool in more detail.

FIG. 1 illustrates a code lineage system 100. As illustrated in FIG. 1, system 100 includes one or more users 105, one or more devices 110, a network 115, a database 120, and a code lineage tool 125. System 100 may be used to determine the lineage of software elements in an application. In particular embodiments, system 100 improves the development and debugging process by determining the dependencies and nested dependencies for particular code elements. This disclosure may refer to code elements as software elements and/or program elements.

Devices 110 may be used by users 105 to develop and/or debug software code. Devices 110 may also be used by users 105 to instruct code lineage tool 125 to determine the lineage of particular program elements. Devices 110 may be any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115.

As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 may store applications and their source code. For example, database 120 may store the files that contain the code for particular applications. Database 120 may send stored information to any other component of system 100, such as, for example, code lineage tool 125. Database 120 may also receive information to store from any component of system 100, such as, for example, devices 110 and/or code lineage tool 125.

Code lineage tool 125 may be used to determine the lineage of particular software elements. As illustrated in FIG. 1, code lineage tool 125 includes a processor 130 and a memory 135. This disclosure contemplates processor 130 and memory 135 being configured to perform any of the functions of code lineage tool 125 described herein.

Processor 130 is any electronic circuitry, including, but not limited to microprocessors, application specific integrated circuits (ASIC), application specific instruction set processor (ASIP), and/or state machines, that communicatively couples to memory 135 and controls the operation of data aggregator 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of code lineage tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

In operation, code lineage tool 125 may receive software code 140. Software code 140 may be code for a particular application that is being debugged. Code lineage tool 125 may retrieve software code 140 from database 120 in response to an instruction received from devices 110. Code lineage tool 125 may analyze software code 140 to determine the lineage of program elements in software code 140.

Code lineage tool 125 may store a grammar file 145 that is used to analyze software code 140. Grammar file 145 may indicate the structure of software code 140 depending on the software coding language that was used to create software code 140. For example, grammar file 145 may be used to identify which portions of software code 140 are functions, variables, database table columns, or other program elements. Grammar file 145 may also be used to determine the relationships between certain program elements. For example, grammar file 145 may indicate that a particular portion of software code 140 is a function that includes five different variables and three other program elements. This disclosure contemplates code lineage tool 125 storing any number of grammar files 145. For example, code lineage tool 125 may store a separate grammar file 145 for different coding languages used to develop applications. This disclosure contemplates code lineage tool 125 being used on software code written in any language or structure (e.g., Structured Query Language, Java, C, Python, extract, transform, and load (ETL), etc.).

Code lineage tool 125 may use grammar file 145 to analyze software code 140 to build a parse tree 150. Parse tree 150 indicates the various program elements in software code 140 along with the relationships between and amongst the various program elements. Parse Tree 150 may structure these relationships so that dependencies and nested dependencies are easily identifiable.

Code lineage tool 125 may then integrate parse tree 150 into a lineage 155. Lineage 155 may indicate the dependencies and nested dependencies between and amongst various program elements. In certain embodiments, lineage 155 may have redundancies and/or unused dependencies removed, whereas parse tree 150 may include such redundancies and dependencies. Code lineage tool 125 may then communicate lineage 155 to indicate the various dependencies and nested dependencies that effect a program element. A developer may use lineage 155 to debug software code 140. For example, a developer may use lineage 155 to determine the various program elements that should be investigated to determine the source of a bug or an error. In this manner the software development and debugging process is improved because lineage 155 makes it easier for the causes and bugs and errors to be identified and fixed.

FIGS. 2 through 5 describe code lineage tool 125 and its operations in more detail.

Figure 2:
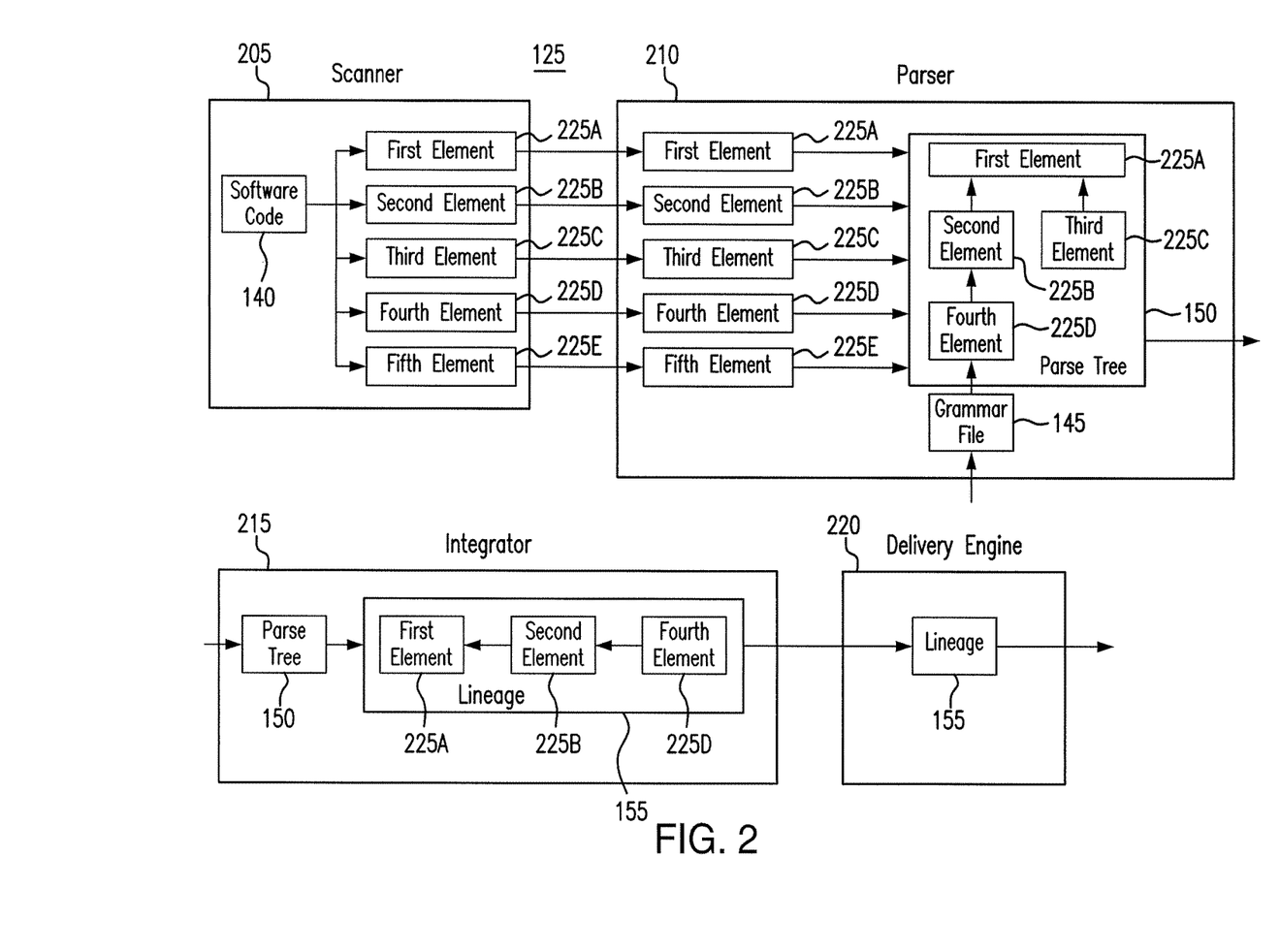
FIG. 2 illustrates a code lineage tool of the system of FIG. 1.

FIG. 2 illustrates a code lineage tool 125 of the system 100 of FIG. 1. As illustrated in FIG. 2, code lineage tool 125 includes a scanner 205, a parser 210, an integrator 215, and a delivery engine 220. This disclosure contemplates that any of scanner 205, parser 210, integrator 215, and/or delivery engine 220 is implemented using processor 130 and/or memory 135. In particular embodiments, code lineage tool 125 improves the software development and debug process by determining and identifying the lineage of particular code elements.

Scanner 205 receives software code 140 for an application. Scanner 205 may have received software code 140 in response to a request to determine the lineage of code elements within software code 140. Scanner 205 may scan software code 140 to identify one or more program elements 225. In the illustrated example of FIG. 2, scanner 205 scans software code 140 and identifies first element 225A, second element 225B, third element 225C, fourth element 225D, and fifth element 225E. Scanner 205 may identify these elements but may be unaware of their relationship and/or their function within software code 140. Scanner 205 may pass the identified code elements 225 to parser 210.

Parser 210 receives code elements 225 and uses a stored grammar file 145 to determine the relationships between and amongst code elements 225 as well as their individual functions within software code 140. For example, parser 210 may determine that a code element 225 is a variable. As another example, parser 210 may determine that a code element 225 is a function. Parser 210 may also use grammar file 145 to determine relationships between and amongst code elements 225. For example, parser 210 may determine that an element 225 (e.g., a value of the element 225) depends upon or is based on two other code elements 225. In the illustrated example of FIG. 2, parser 210 receives first element 225A, second element 225B, third element 225C, fourth element 225D and fifth element 225E. Parser 210 then uses grammar file 145 to determine that first element 225A depends on second element 225A and third element 225C. Parser 210 may also determine using grammar file 145 that second element 225B depends on fourth element 225D. First element 225A may be a function, second element 225B and third element 225C may be variables needed to call first element 225A. Fourth element 225D may be another variable that influences the value of second element 225B.

This disclosure contemplates that a first code element affects a second code element by affecting the second code element's value. For example, a first code element affects a second code element if a change to a value of the first code element causes the value of the second code element to change. A redundancy may occur if a third code element also affects the value of the second code element, but only if the first code element did not change. In other words, the third code element is unused in determining the second code element if the first code element changed.

Parser 210 may generate parse tree 150 after determining the relationships between and amongst the code elements 225. Parse tree 150 may indicate the relationship between and amongst the various program elements 225 received by parser 210. Using the illustrated example of FIG. 2, parser 210 adds first element 225A to parse tree 150 as a node. Parser 210 then adds second element 225B and third element 225C as sub nodes of first element 225A in parse tree 150. Parser 210 then adds fourth element 225D as a sub node of second element 225B in parse tree 150. This arrangement of nodes and sub nodes indicates that first element 225A is affected by second element 225B and third element 225C and that second element 225B is affected by fourth element

225D. Parser 210 communicates parse tree 150 for integration by integrator 215. This disclosure contemplates parser 210 generating a parse tree 150 for software code 140 written in any language or structure (e.g., Structured Query Language, Java, C, Python, extract, transform, and load (ETL), etc.).

Integrator 215 evaluates parse tree 150 to determine a lineage for certain code elements 225. Specifically, integrator 215 may analyze the relationships between and amongst code elements 225 included in parse tree 150 to determine how each code element 225 is derived. In the illustrated example of FIG. 2, integrator 215 analyzes parse tree 150 to determine that first element 225A is affected by second element 225B. Integrator 215 may also determine that second element 225B is affected by fourth element 225D. Integrator 215 may capture these relationships by generating a lineage 155 that indicates that first element 225A is affected by or based on second element 225B and that second element 225B is affected by or based on fourth element 225D. The lineage indicates that a change to fourth element 225D will change a value of first element 225A and a value of second element 225B. Integrator 215 may then communicate lineage 155 to delivery engine 220.

Integrator 215 may not include and/or remove third element 225C from lineage 155. In response to a determination that third element 225C does not affect first element 225A when second element 225B affects first element 225A. For example, if first element 225A is a function and second element 225B and third element 225C are variables used to call the function, integrator 215 may determine that third element 225C is not needed to call the function when second element 225B is provided. Thus, lineage 155 may indicate only that first element 225A is affected by second element 225B and that second element 225B is affected by fourth element 225D. In some instances, integrator 215 may generate a second lineage 155 that indicates only that first element 225A is affected by third element 225C. In other words, integrator 215 may evaluate scenarios where certain program elements 225 do not affect an indicated program element 225 and remove them accordingly from lineage 155.

In some embodiments, parser 210 may analyze parse tree 150 and determine that first element 225A is influenced or affected by third element 225C. In these instances, integrator 215 adds third element 225C to lineage 155 and lineage 155 indicates that first element 225A is based on third element 225C, in addition to second element 225B.

In particular embodiments, parser 210 may determine, using grammar file 145 that fifth element 225E does not affect any of first element 225A, second element 225B, third element 225C, or fourth element 225D. In other words, if a change occurred to fifth element 225E, then no corresponding change would occur in any of the other elements 225A-D. In response, parser 210 may exclude fifth element 225E from parse tree 150.

In certain embodiments, integrator 214 may produce a separate lineage 155 to show the relationship between first element 225A and third element 225C. As a result, integrator 215 may produce one or more lineages 155 for first element 225A. A first lineage 155 indicates first element 225A being based on second element 225B and a second lineage 155 indicates first element 225A being based on third element 225C.

In certain embodiments, integrator 215 may determine that a particular element 225 is redundant. For example, parser 210 may determine that fifth element 225E is redundant to first element 225A, second element 225B, third element 225C, and fourth element 225D. In response, integrator 215 may exclude fifth element 225E from any of the generated lineages 155. As another example, parser 210 may determine that third element 225C is redundant to second element 225B with respect to how they affect first element 225A (e.g., third element 225C may not affect first element 225A when second element 225B affects first element 225A). As a result, integrator 215 may exclude third element 225C from any generated lineages 155 for first element 225A.

In particular embodiments, integrator 215 may also generate a graph based on lineage 155. The graph indicates the relationships in lineage 155. In the illustrated example of FIG. 2, a graph may indicate that first element 225A is based on second element 225B and that second element 225B is based on fourth element 225D.

Integrator 215 may communicate lineage 155 to delivery engine 220. Delivery engine 220 may communicate lineage 155 to a recipient, such as, for example, a user 105 who requested lineage 155 or a user 105 who requested that software code 140 be scanned. Delivery engine 220 may use any communication type, such as, for example, email, text message, instant message, and/or FTP to communicate lineage 155. The communication type may have been supplied by a requesting user 105.

In certain embodiments, parser 210 may generate any number of parse trees based on software code 140. For example, parser 210 may generate a separate parse tree 150 that indicates first element 225A is based on third element 225C.

In particular embodiments, by using code lineage tool 125, the dependencies and nested dependencies within software code 140 may be identified and delivered to a code developer. The code developer may use lineage 155 to identify the causes of bugs and errors in code. In some embodiments, a developer may use lineage 155 to determine the relationship between and amongst columns in a database.

Figure 3:
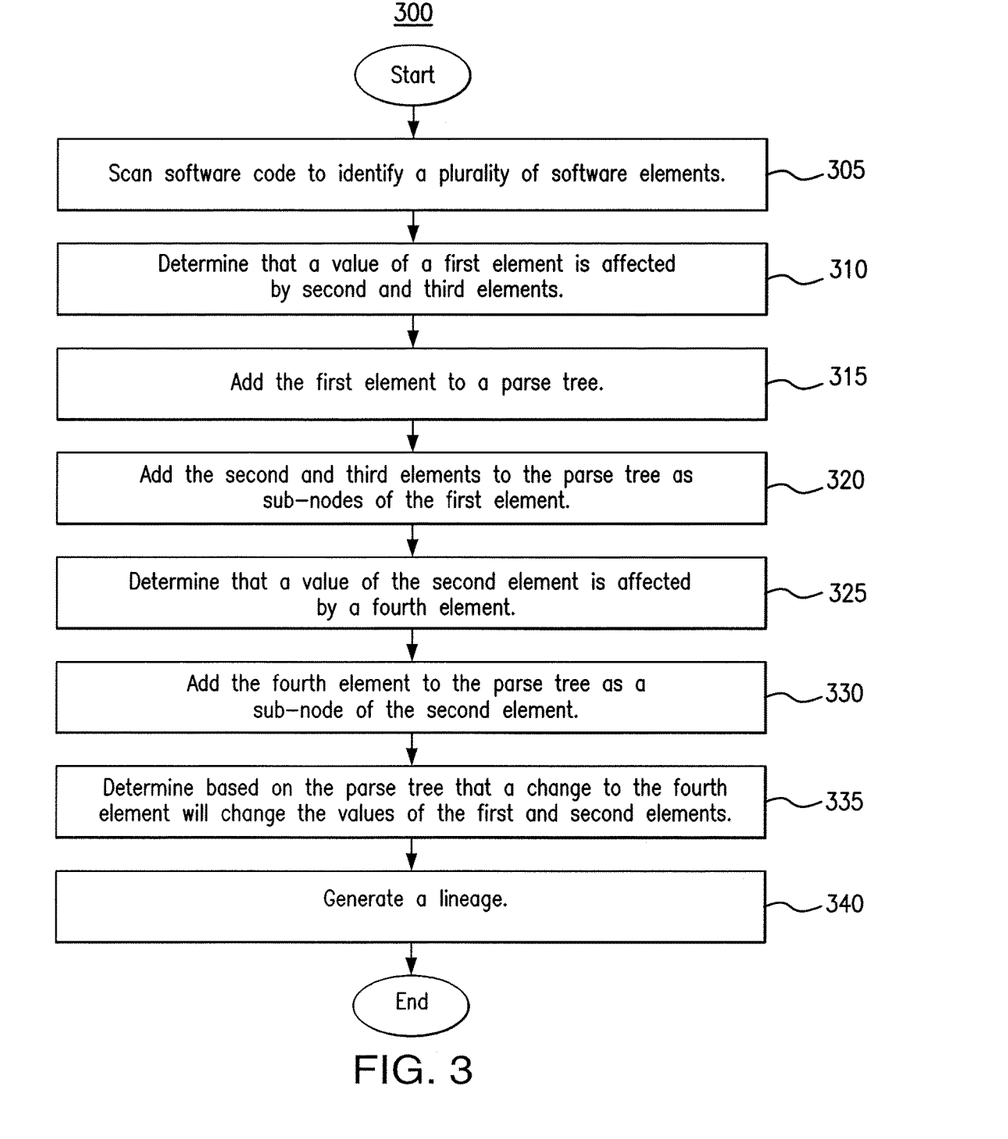
FIG. 3 is a flowchart illustrating a method for determining code lineage using the system of FIG. 1.

FIG. 3 is a flow chart illustrating a method 300 for determining code lineage using the system 100 of FIG. 1. In particular embodiments, code lineage tool 125 performs method 300. By performing method 300, code lineage tool 125 improves the software development and debugging process by determining a lineage for code elements in the software code.

Code lineage tool 125 may begin by scanning software code to identify a plurality of software elements in step 305. In step 310, code lineage tool 125 determines that a value of a first element is effected by a second and third element. Code lineage tool 125 may then add the first element to a parse tree in step 315. In step 320, code lineage tool 125 adds the second and third element to the parse tree as sub nodes of the first element.

In step 325, code lineage tool 125 determines that a value of the second element is effected by a fourth element. Code lineage tool 125 then adds the fourth element to the parse tree as a sub node of the second element in step 330. In step 335, code lineage tool 125 determines, based on the parse tree, that a change to the fourth element will change the value of the first and second elements in step 335. Code lineage tool 125 then generates a lineage in step 340.

Figure 4:
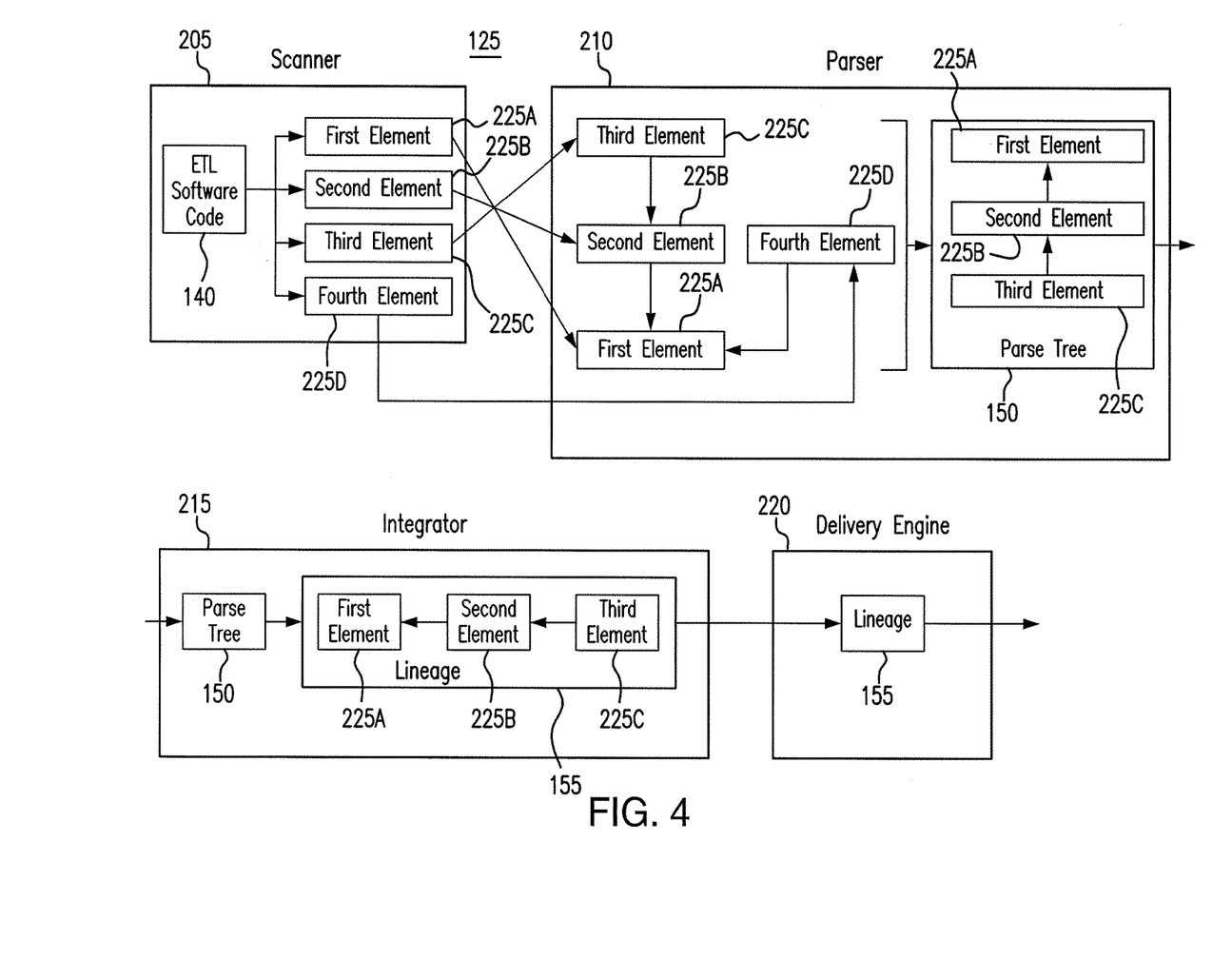
FIG. 4 illustrates a code lineage tool of the system of FIG. 1.
Figure 5:
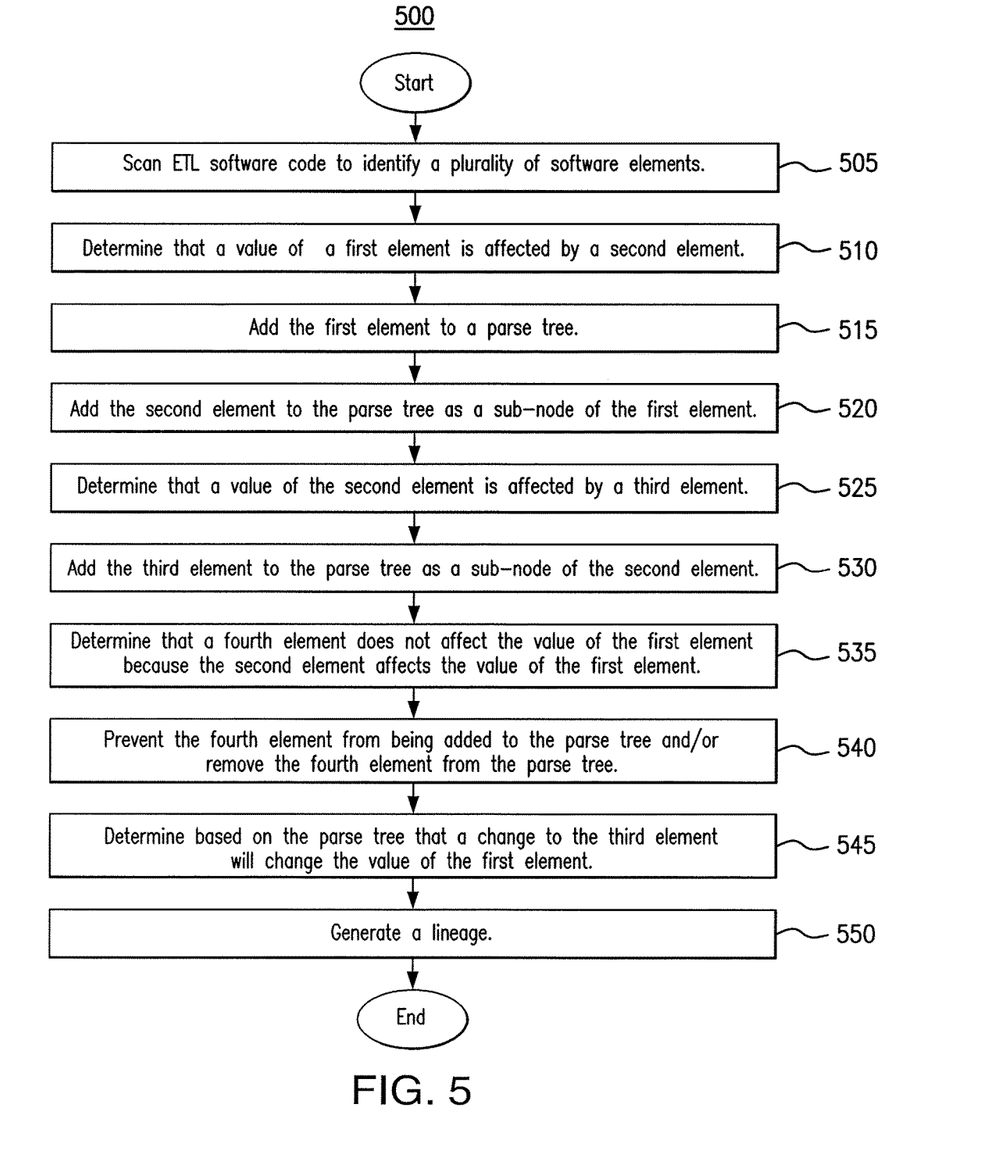
FIG. 5 is a flowchart illustrating a method for determining code lineage using the system of FIG. 1.

FIGS. 4 and 5 describe the operation of code lineage tool 125 when operating on a particular type of software code called Extract, Transform, and Load (ETL) code. ETL software code presents certain challenges to code lineage tool 125 because dependencies and nested dependencies may be more difficult to determine in ETL software code, specifically, certain redundancies and unimportant dependencies may be identified in ETL software code that may not be included in a lineage. Code lineage tool 125 is designed to generate an appropriate lineage for ETL software code in particular embodiments.

FIG. 4 illustrates a code lineage tool 125 of the system 100 of FIG. 1. As illustrated in FIG. 4, code lineage tool 125 includes a scanner 205, a parser 210, an integrator 215, and delivery engine 220. In particular embodiments, code lineage tool 125 is configured to determine dependencies and nested dependencies in ETL software code, thus improving the software development and debug process.

Scanner 205 receives ETL software code 140. Scanner 205 may receive and/or retrieve ETL software code 140 in response to a user request to generate a lineage for ETL software code 140. Scanner 205 may scan ETL software code 140 to determine the code elements 225 in ETL software code 140. In the illustrated example of FIG. 4, scanner 205 scans ETL software code 140 and identifies first element 225A, second element 225B, third element 225C, and fourth element 225D. These elements 225 may be any appropriate software elements such as, for example, a variable, a function, and/or a database table column. Scanner 205 may pass these elements 225 to parser 210.

Parser 210 may analyze code elements 225 using a stored grammar file 145 to determine dependencies and nested dependencies between and amongst the elements 225 as discussed above. Parser 210 may then generate a parse tree 150 that indicates the determined dependencies and nested dependencies.

ETL software code presents certain challenges when determining dependencies and nested dependencies. Specifically, ETL software code may include dependencies and nested dependencies that are redundant or unimportant. For example, ETL software code 140 may indicate that certain elements depend on other elements, when in reality, those elements may not share a relationship that will be implemented or have any effect when ETL software code 140 is executed (e.g., as a result of an unused program branch or a switch statement).

Parser 210 may determine redundant and/or unimportant dependencies or nested dependencies and eliminate them from parse tree 150. Using the illustrated example of FIG. 4, parser 210 may determine that first element 225A is based on second element 225B and fourth element 225D. In other words, if a change occurs to the second element 225B or fourth element 225D, a change may occur to first element 225A. Parser 210 may also determine that second element 225B is based on third element 225C. Parser 210 may then further evaluate ETL software code 140 using, for example, a stored grammar file 145 to determine that fourth element 225D is redundant. Specifically, parser 210 may determine that fourth element 225D may not in actuality affect first element 225A because use of second element 225B supersedes fourth element 225D. In other words, when ETL software code 140 is implemented and/or executed, the code may never use fourth element 225D to determine first element 225A even though there may be portions of the code that use fourth element 225D to determine first element 225A. For example, these portions of code may never be reached during a regular execution. In response to such a determination, parser 210 may remove fourth element 225D from parse tree 150 and/or prevent fourth element 225D from being added to parse tree 150. For example, parser 210 may remove fourth element 225D from parse tree 150 or it may prevent fourth element 225D from being added to parse tree 150.

Parser 210 may then generate parse tree 150 to indicate the relationships between and among first element 225A, second element 225B and third element 225C. In the illustrated example of FIG. 4, parse tree 150 indicates that first element 225A is based on second element 225B and that second element 225B is based on third element 225C. Parser 210 may communicate parse tree 150 to integrator 215.

In particular embodiments, parser 210 may generate a second parse tree 150 that indicates the relationship between first element 225A and fourth element 225D. Specifically, the second parse tree 150 may indicate that first element 225A is based on fourth element 225D.

Integrator 215 may analyze parse tree 150 to generate a lineage 155. Integrator 215 may use the dependencies and nested dependencies indicated in parse tree 150 to generate a lineage that shows the relationships between and amongst the various program elements 225. Using the illustrated example of FIG. 4, integrator 215 may generate a lineage 155 that indicates that first element 225A is based on second element 225B and that second element 225B is based on third element 225C. Integrator 215 may then pass lineage 155 to delivery engine 220.

In particular embodiments, integrator 215 may receive one or more parse trees 150 from parser 210. Integrator 215 may integrate the one or more parse trees 150 to generate a lineage 155. In some instances, integrator 215 may determine that certain program elements are redundant and exclude them from lineage 155. For example, if there was a second parse tree 150 that showed the relationship between first element 225A and fourth element 225D, integrator 215 may determine that fourth element 225D is redundant and exclude fourth element 225D from lineage 155.

In particular embodiments, integrator 215 may further generate a graph based on lineage 155. The graph may include a visual representation that indicates the relationship between and amongst the various program elements. For example, the graph may indicate that first element 225A is based on second element 225B and that second element 225B is based on third element 225C.

In some embodiments, integrator 215 determines that certain program elements 225 are redundant and excludes them from any lineages 155 in response, as discussed above.

Delivery engine 220 may deliver lineage 155 to a requesting user as discussed above.

FIG. 5 is as flow chart illustrating a method 500 for determining code lineage using the system 100 of FIG. 1. In particular embodiments, code lineage tool 125 performs method 500. Code lineage tool 125 improves the code development and debugging process by performing method 500, in certain instances.

Code lineage tool 125 begins by scanning ETL software code to identify a plurality of software elements in step 505. In step 510, code lineage tool 125 determines that a value of a first element is affected by a second element. In Step 515, code lineage tool 125 adds the first element to a parse tree, code lineage tool 125 then adds the second element to the parse tree as a sub node of the first element in step 520. In step 525, code lineage tool 125 determines that a value of the second element is affected by a third element. Code lineage tool 125 adds the third element to the parse tree as sub node of the second element in step 530.

In step 535, code lineage tool 125 determines that a fourth element does not affect the value of the first element because the second element effects the value of the first element. Code lineage tool 125 prevents the fourth element from being added to the parse tree and/or removes the fourth element from the parse tree in step 540. In step 545, code lineage tool 125 determines, based on the parse tree that a change to the third element will change the value to the first element. In step 550, code lineage tool 125 generates a lineage.

Modifications, additions, or omissions may be made to methods 300 and 500 depicted in FIGS. 3 and 5. Methods 300 and 500 may include more, fewer, or other steps. For example, steps may be perfomied in parallel or in any suitable order. While discussed as code lineage tool 125 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A code lineage tool comprising:
 a scanner configured to identify a plurality of elements in extract, transform, load (ETL) software code by scanning the ETL software code; and
 a hardware processor configured to implement:
  a parser configured to:
   determine, based on a stored grammar file, that a first element of the plurality of elements is a function whose value is affected by a second element of the plurality of elements;
   determine, based on the stored grammar file, that the second element is a variable used when calling the first element;
   add the first element to a parse tree;
   add the second element to the parse tree as a sub-node of the first element in response to the determination that the second element is used when calling the first element;
   determine, based on the stored grammar file, that a value of the second element is affected by a third element of the plurality of elements;
   determine, based on the stored grammar file, that the third element is a variable;
   determine, based on the stored grammar file, that the third element is used when calling the first element;
   add the third element to the parse tree as a sub-node of the second element in response to the determination that the third element is used when calling the first element;
   determine, that a fourth element of the plurality of elements affects the value of the second element; and
   in response to the determination that the fourth element affects the value of the second element, add the fourth element to the parse tree as a sub-node of the second element; and
  an integrator configured to:
   determine that the third element is not needed when calling the first element when the second element is provided to the first element;
   determine, based on the parse tree, that a change to the fourth element will change the value of the first element;
   generate a lineage for the first element, the lineage comprising an identification of the first element and the fourth element and an indication that the first element is based on the fourth element;
   exclude the third element from the lineage in response to the determination that the third element is not needed when calling the first element when the second element is provided to the first element;
   determine, based on the parse tree, that when a change to a fifth element of the software code occurs, no corresponding change occurs in the first, second, and third elements;
   exclude the fifth element from the lineage in response to the determination that no corresponding change occurs when the change to the fifth element occurs;
   determine, based on the parse tree, that a sixth element of the software code will not execute as a result of a switch statement;
   exclude the sixth element from the lineage in response to the determination that the sixth element will not execute; and
  a delivery engine configured to email the lineage for presentation to a user who requested that the software code be scanned.

2. The code lineage tool of claim 1, wherein the integrator is further configured to add the third element to the lineage as a sub-node of the first element before excluding the third element from the lineage.

3. The code lineage tool of claim 1, wherein the parser is further configured to add the first element and the fourth element to a second parse tree.

4. The code lineage tool of claim 1, wherein the user requested that the lineage be communicated via email.

5. The code lineage tool of claim 1, wherein the fourth element is a database table column.

6. The code linage tool of claim 1, wherein the lineage is used to identify a bug in the software code.

7. The code lineage tool of claim 1, wherein the integrator is further configured to generate a graph based on the lineage, the graph indicating that the first element is based on the third element.

8. A method comprising:
 identifying a plurality of elements in extract, transform, load (ETL) software code by scanning the ETL software code;
 determining, based on a stored grammar file, that a first element of the plurality of elements is a function whose value is affected by a second element of the plurality of elements and a third element of the plurality of elements;
 determining, based on the stored grammar file, that the second element is a variable used when calling the first element;
 adding the first element to a parse tree;
 adding the second element to the parse tree as a sub-node of the first element in response to the determination that the second element is used when calling the first element;
 determining, based on the stored grammar file, that a value of the second element is affected by a third element of the plurality of elements;
 determining, based on the stored grammar file, that the third element is a variable;
 determine, based on the stored grammar file, that the third element is used when calling the first element;

adding the third element to the parse tree as a sub-node of the second element in response to the determination that the third element is used when calling the first element;

determining, that a fourth element of the plurality of elements affects the value of the second element;

in response to the determination that the fourth element affects the value of the second element, adding the fourth element to the parse tree as a sub-node of the second element;

determining that the third element is not needed when calling the first element when the second element is provided to the first element;

determining, based on the parse tree, that a change to the fourth element will change the value of the first element;

generating a lineage for the first element, the lineage comprising an identification of the first element and the fourth element and an indication that the first element is based on the fourth element;

excluding the third element from the lineage in response to the determination that the third element is not needed when calling the first element when the second element is provided to the first element;

determining, based on the parse tree, that when a change to a fifth element of the software code occurs, no corresponding change occurs in the first, second, and third elements;

excluding the fifth element from the lineage in response to the determination that no corresponding change occurs when the change to the fifth element occurs;

determining, based on the parse tree, that a sixth element of the software code will not execute as a result of a switch statement;

excluding the sixth element from the lineage in response to the determination that the sixth element will not execute; and emailing the lineage for presentation to a user who requested that the software code be scanned.

9. The method of claim 8, further comprising adding the third element to the lineage as a sub-node of the first element before excluding the third element from the lineage.

10. The method of claim 8, further comprising adding the first element and the fourth element to a second parse tree.

11. The method of claim 8, wherein the user requested that the lineage be communicated via email.

12. The method of claim 8, wherein the fourth a database table column.

13. The method of claim 8, wherein the lineage is used to identify a bug in the software code.

14. The method of claim 8, further comprising generating a graph based on the lineage, the graph indicating that the first element is based on the third element.

15. A system comprising:
a database configured to store extract, transform, load (ETL) software code; and
a code lineage tool comprising a hardware processor configured to:
identify a plurality of elements in the ETL software code by scanning the ETL software code;
determine, based on a stored grammar file, that a first element of the plurality of elements is a function whose value is affected by a second element of the plurality of elements and a third element of the plurality of elements;
determine, based on the stored grammar file, that the second element is a variable used when calling the first element;
add the first element to a parse tree;
add the second element to the parse tree as a sub-node of the first element in response to the determination that the second element is used when calling the first element;
determine, based on the stored grammar file, that a value of the second element is affected by a third element of the plurality of elements;
determine, based on the stored grammar file, that the third element is a variable;
determine, based on the stored grammar file, that the third element is used when calling the first element;
add the third element to the parse tree as a sub-node of the second element in response to the determination that the third element is used when calling the first element;
determine, that a fourth element of the plurality of elements affects the value of the second element;
in response to the determination that the fourth element affects the value of the second element, add the fourth element to the parse tree as a sub-node of the second element;
determine that the third element is not needed when calling the first element when the second element is provided to the first element;
determine, based on the parse tree, that a change to the fourth element will change the value of the first element;
generate a lineage for the first element, the lineage comprising an identification of the first element and the fourth element and an indication that the first element is based on the fourth element;
exclude the third element from the lineage in response to the determination that the third element is not needed when calling the first element when the second element is provided to the first element;
determine, based on the parse tree, that when a change to a fifth element of the software code occurs, no corresponding change occurs in the first, second, and third elements;
exclude the fifth element from the lineage in response to the determination that the no corresponding change occurs when the change to fifth element occurs;
determine, based on the parse tree, that a sixth element of the software code will not execute as a result of a switch statement;
exclude the sixth element from the lineage in response to the determination that the sixth element will not execute; and
email the lineage for presentation to a user who requested that the software code be scanned.

16. The system of claim 15, wherein the hardware processor is further configured to add the third element to the lineage as a sub-node of the first element before excluding the third element from the lineage.

17. The system of claim 15, wherein the hardware processor is further configured to add the first element and the fourth element to a second parse tree.

18. The system of claim 15, wherein the user requested that the lineage be communicated via email.

19. The system of claim 15, wherein the fourth element is a database table column.

20. The system of claim 15, wherein the code lineage tool is further configured to generate a graph based on the lineage, the graph indicating that the first element is based on the third element.

21. The system of claim 15, wherein the lineage is used to identify a bug in the software code.

* * * * *